United States Patent
Abkowitz et al.

(10) Patent No.: US 9,992,134 B2
(45) Date of Patent: Jun. 5, 2018

(54) SYSTEMS AND METHODS TO FORWARD PACKETS NOT PASSED BY CRITERIA-BASED FILTERS IN PACKET FORWARDING SYSTEMS

(71) Applicant: IXIA, Calabasas, CA (US)

(72) Inventors: Patricia A. Abkowitz, Austin, TX (US); Ramona Boyd, Gun Barrel City, TX (US); Andrew Spooner, The Hills, TX (US); Ronald A. Pleshek, Austin, TX (US)

(73) Assignee: KEYSIGHT TECHNOLOGIES SINGAPORE (HOLDINGS) PTE LTD, Singapore (SG)

( * ) Notice: Subject to any disclaimer, the term of this patent is extended or adjusted under 35 U.S.C. 154(b) by 178 days.

(21) Appl. No.: 14/722,459

(22) Filed: May 27, 2015

(65) Prior Publication Data

US 2016/0352626 A1    Dec. 1, 2016

(51) Int. Cl.
*H04L 12/28* (2006.01)
*H04L 12/937* (2013.01)

(52) U.S. Cl.
CPC .................. *H04L 49/253* (2013.01)

(58) Field of Classification Search
CPC ......... H04L 45/38; H04L 49/10; H04L 49/15; H04L 49/25; H04L 49/30
See application file for complete search history.

(56) References Cited

U.S. PATENT DOCUMENTS

| 5,515,376 A | 5/1996 | Murthy et al. |
| 6,321,259 B1 | 11/2001 | Oullette et al. |
| 6,578,147 B1 | 6/2003 | Shanklin et al. |
| 6,700,891 B1 * | 3/2004 | Wong .................. H04L 63/0245 370/389 |
| 6,785,286 B1 | 8/2004 | O'Keeffe et al. |
| 6,839,349 B2 | 1/2005 | Ambe et al. |
| 6,853,623 B2 | 2/2005 | Nederveen et al. |

(Continued)

OTHER PUBLICATIONS

S. Edwards, "Vulnerabilities of Network Intrusion Detection Systems: Realizing and Overcoming the Risks; The Case for Flow Mirroring," Top Layer Networks, Inc., May 1, 2002.

(Continued)

*Primary Examiner* — Alvin Zhu
*Assistant Examiner* — Bo Hui A. Zhu

(57) ABSTRACT

Systems and methods are disclosed to forward packets not passed by criteria-based filters in packet forwarding systems. The disclosed embodiments include one or more Not Passed By Criteria (NPBC) filters that are defined for input ports along with one or more criteria-based filters, such as for example, Pass by Criteria (PBC) filters and/or Deny by Criteria filters (DBC), that forward packets not passed by these criteria-based filters. NPBC filters include, for example, Pass Unmatched PBC filters associated with PBC filters and configured to forward packets not passed by PBC filters and/or Pass Matched DBC filters associated with DBC filters and configured to forward packets not passed by DBC filters. Using one or more NPBC filters within the disclosed embodiments, packet data that is not being passed along to output ports by the criteria-based filters can be easily passed to one or more designated output ports.

12 Claims, 9 Drawing Sheets

(56) References Cited

U.S. PATENT DOCUMENTS

| | | |
|---|---|---|
| 6,901,517 B1 | 5/2005 | Redmore |
| 6,920,112 B1 | 7/2005 | McCloghrie et al. |
| 6,954,775 B1 | 10/2005 | Shanklin et al. |
| 6,996,779 B2 | 2/2006 | Meandzija et al. |
| 7,016,980 B1 | 3/2006 | Mayer et al. |
| 7,027,437 B1 | 4/2006 | Merchant et al. |
| 7,142,518 B2 | 11/2006 | Mitchell |
| 7,143,196 B2 | 11/2006 | Rimmer et al. |
| 7,254,114 B1 | 4/2007 | Turner et al. |
| 7,245,620 B2 | 7/2007 | Shankar |
| 7,310,306 B1 | 12/2007 | Cheriton |
| 7,424,018 B2 | 9/2008 | Gallatin et al. |
| 7,554,984 B2 | 6/2009 | Kalkunte et al. |
| 7,688,727 B1 | 3/2010 | Ferguson et al. |
| 7,769,873 B1 | 8/2010 | Mackie |
| 7,889,711 B1 | 2/2011 | Minei et al. |
| 7,917,647 B2 | 3/2011 | Cooper et al. |
| 8,018,943 B1 | 9/2011 | Pleshek et al. |
| 8,098,677 B1 | 1/2012 | Pleshek et al. |
| 8,200,203 B1 | 6/2012 | Christensen et al. |
| 8,447,718 B2 | 5/2013 | Norton et al. |
| 8,842,548 B2 | 9/2014 | Pleshek et al. |
| 8,902,895 B2 | 12/2014 | Pleshek et al. |
| 8,934,495 B1 | 1/2015 | Hilton et al. |
| 2001/0022786 A1 | 9/2001 | King et al. |
| 2001/0055274 A1 | 12/2001 | Hegge et al. |
| 2002/0186259 A1 | 12/2002 | Meandzija et al. |
| 2003/0046657 A1 | 3/2003 | White |
| 2003/0074421 A1 | 4/2003 | Kusano et al. |
| 2004/0003094 A1 | 1/2004 | See |
| 2004/0042470 A1 | 3/2004 | Cooper et al. |
| 2004/0103321 A1 | 5/2004 | Wesinger, Jr. et al. |
| 2004/0107361 A1 | 6/2004 | Redan et al. |
| 2004/0196841 A1 | 10/2004 | Tüdor et al. |
| 2005/0053073 A1 | 3/2005 | Kloth et al. |
| 2005/0182950 A1 | 8/2005 | Son et al. |
| 2006/0256788 A1 | 11/2006 | Donahue |
| 2008/0008202 A1 | 1/2008 | Terrell et al. |
| 2008/0072292 A1 | 3/2008 | Narjala |
| 2008/0222731 A1 | 9/2008 | Dowd et al. |
| 2009/0007021 A1 | 1/2009 | Hayton |
| 2009/0013052 A1 | 1/2009 | Robarts et al. |
| 2009/0150996 A1 | 6/2009 | Haswell |
| 2009/0172148 A1 | 7/2009 | Underwood |
| 2009/0327903 A1 | 12/2009 | Smith et al. |
| 2010/0027554 A1 | 2/2010 | Kuthan et al. |
| 2010/0332618 A1 | 12/2010 | Norton et al. |
| 2011/0317694 A1 | 12/2011 | Pleshek et al. |
| 2012/0079107 A1 | 3/2012 | Williams et al. |
| 2012/0106354 A1 | 5/2012 | Pleshek et al. |
| 2016/0197736 A1* | 7/2016 | Shvarzberg ......... H04L 12/6418 713/310 |

OTHER PUBLICATIONS

A. Esson and J. Mannos, "Broadcom BCM5600 StrataSwitch; A Highly Integrated Ethernet Switch on a Chip," Broadcom Corporation, Hot Chips Aug. 17, 1999.

J. Magee, "The Case for IDS Balancing vs. a Switch," Top Layer Networks, Inc., May 2003.

G. Marshall, SC Magazine Reprint, "Attack Mitigator," Aug. 2002.

F. Muhtar, "Appliances to Boost Network Defence," CyberSecurity Malaysia, Nov. 26, 2001.

National Information Assurance Partnership, "Common Criteria Evaluation and Validation Scheme, Validation Report; Top Layer Networks; IDS BalancerTM Version 2.2 Appliance (IDSB3531-CCV1.0, IDSB3532-CCV1.0, IDSB4508-CCV1.0)," Report No. CCEVS-VR-04-0074, National Institute of Standards and Technology; National Security Agency, Sep. 3, 2004.

Radware, "Radware's Smart IDS Management; FireProof and Intrusion Detection Systems; Deployment and ROI," North America Radware, Inc.; International Radware, Ltd., Aug. 21, 2002.

SC Magazine Reprint, "IDS Balancer 3500 Appliance," Jul. 2002.

Top Layer Networks, Inc., "Top Layer Advances Scaleable Intrusion Detection With Industry Leading Multi-Gigabit Offering," Press Release, Mar. 10, 2003.

Top Layer Networks, Inc., "Product Enhancements Optimize Existing Network Intrusion Detection and Prevention Environments," Press Release, Aug. 18, 2003.

Top Layer Networks, Inc., "Case Study—IDS Balancer; Building an Intelligent Monitoring Layer Using the Top Layer IDS Balancer Ensures Full Security Coverage for University of California, Irvine," www.TopLayer.com; 2003.

Top Layer Networks, Inc., "IDS Balancer 3.0 Delivers Ultimate Flexibility in Selecting, Filtering and Distributing Network Traffic," Press Release, Oct. 20, 2004.

Top Layer Networks, Inc., "IDS Balancer; Aggregation, Filtering, & Load Appliance," internet advertisement, www.TopLayer.com., 2004.

Top Layer Networks, Inc., "APP Switch 2500; The Original Top Layer Device to Perfect the Art of Network Security," internet advertisement, www.TopLayer.com.

Cisco, White Paper, "VXLAN Overview: Cisco Nexus 9000 Series Switches", 2013, 10 pgs.

IXIA, "Anue Net Tool Optimizer 5288", High Density 100GE/40GE/10GE Network Monitoring Switch, Data Sheet, Jan. 2015, 6 pgs.

* cited by examiner

SYSTEMS AND METHODS TO FORWARD PACKETS NOT PASSED BY CRITERIA-BASED FILTERS IN PACKET FORWARDING SYSTEMS

TECHNICAL FIELD OF THE INVENTION

This invention relates to managing network packets and providing visibility for network packet communication systems.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switch systems. For example, certain network switch systems produced by Cisco Systems include SPAN ports to which traffic on the switches are mirrored. It is also noted that other packet monitoring or access methods may also be used to acquire copies of network packets being communicated within a network infrastructure.

To help alleviate the problem of limited access to network packets for monitoring, tool aggregation devices or packet broker devices have been developed that allow shared access to the monitored network packets. These tool aggregation devices allow users to obtain packets from one or more network monitoring points (e.g., network hub, TAP, SPAN port, etc.) and to forward them to different network monitoring tools. U.S. Pat. No. 8,018,943, U.S. Pat. No. 8,098,677, and U.S. Pat. No. 8,934,495 describe example embodiments for network tool optimizer systems that provide packet forwarding systems for tool aggregation and packet broker solutions and describe in part configuration of user-define filters, automatic creation of filter engine forwarding rules, automatic handling of filter overlaps, graphical user interfaces (GUIs) for filter creation, and other features. U.S. Pat. No. 8,018,943, U.S. Pat. No. 8,098,677, and U.S. Pat. No. 8,934,495 are each hereby incorporated by reference in its entirety.

Packet forwarding systems often allow filtering of packets and related forwarding actions to be based upon specific packet data criteria (e.g., at least one criterion related to the packet) to pass or deny network communication traffic from input ports to output ports. For example, Pass by Criteria (PBC) filters can be used to pass only input packets matching selected criteria from input ports to output ports, and Deny by Criteria (DBC) filters can be used to pass only input packets not matching selected criteria from input ports to output ports. Thus, packets that match such PBC filters or do not match such DBC filters are passed to output ports and ultimately to destination devices, such as network monitoring tools, connected to these output ports. Packets that are not passed by such criteria-based filters are dropped.

SUMMARY OF THE INVENTION

Systems and methods are disclosed to forward packets not passed by criteria-based filters in packet forwarding systems. The disclosed embodiments include one or more Not Passed By Criteria (NPBC) filters that are defined for input ports along with one or more criteria-based filters, such as for example, Pass by Criteria (PBC) filters and/or Deny by Criteria filters (DBC), that forward packets not passed these criteria-based filters. These NPBC filters include, for example, Pass Unmatched PBC filters that are associated with PBC filters and that are configured to forward packets not passed by PBC filters to one or more designated output ports, and/or Pass Matched DBC filters that are associated with DBC filters and that are configured to forward packets not passed by DBC filters to one or more designated output ports. Using one or more NPBC filters, packet data that is not being passed along to output ports by the criteria-based filters can be easily passed to one or more designated output ports. Various combinations of criteria-based filters can be used for input ports along with one or more NPBC filters also associated with these input ports. Other features and variations can be implemented, if desired, and related systems and methods can be utilized, as well.

For one embodiment, a packet forwarding system for network packets including input ports configured to receive packets from one or more network sources, output ports configured to send packets to one or more network destinations, filter engines configured to determine how packets are forwarded by packet forwarding circuitry from the input ports to the output ports based upon packet forwarding rules, a user interface configured to allow configuration of one or more by-criteria (BC) filters and one or more not-passed-by-criteria (NPBC) filters for a common input port where each BC filter is configured to pass packets received from the common input port to at least one output port based upon at least one criterion relating to the received packets and where each NPBC filter is configured to pass received packets not passed by the BC filters to at least one output port, and a filter processor configured to generate packet forwarding rules for the filter engines based upon the one or more BC filters and the one or more NPBC filters and to apply the packet forwarding rules to the filter engines.

In further embodiments, the one or more BC filters include one or more pass-by-criteria (PBC) filters coupled to the common input port, and each PBC filter is configured to pass received packets that match at least one criterion relating to the received packets from the common input port to at least one output port. In additional embodiments, the one or more NPBC filters include a pass unmatched PBC filter coupled to the common input port, and the pass unmatched PBC filter is configured to pass received packets that do not match any of the PBC filters from the common input port to at least one output port. In still further embodiments, the at least one output port for the pass unmatched PBC filter is different from the at least one output port for the PBC filters.

In still further embodiments, the one or more BC filters includes one or more deny-by-criteria (DBC) filters coupled to the common input port, and each DBC filter is configured to pass received packets that do not match at least one criterion relating to the received packets from the common input port to at least one output port. In additional embodiments, the one or more NPBC filters includes a pass matched DBC filter coupled to the common input port, and the pass matched DBC filter is configured to pass received packets that match all of the DBC filters from the common input port to at least one output port. In still further embodiments, the at least one output port for the pass matched DBC filter is different from the at least one output port for the DBC filters.

In additional embodiments, the one or more BC filters include one or more pass-by-criteria (PBC) filters coupled to the common input port where each PBC filter is configured to pass received packets that match at least one criterion relating to the received packets from the common input port to at least one output port and also include one or more deny-by-criteria (DBC) filters coupled to the common input port where each DBC filter is configured to pass received packets that do not match at least one criterion relating to the received packets from the common input port to at least one output port. In further embodiments, the one or more NPBC filters include a pass unmatched PBC filter coupled to the common input port where the pass unmatched PBC filter is configured to pass received packets that do not match any of the PBC filters from the common input port to at least one output port and also include a pass matched DBC filter coupled to the common input port where the pass matched DBC filter is configured to pass received packets that match all of the DBC filters from the common input port to at least one output port. In still further embodiments, the at least one output port for the pass unmatched PBC filter is different from the at least one output port for the PBC filters, and the at least one output port for the pass matched DBC filter is different from the at least one output port for the DBC filters.

For another embodiment, a method is disclosed to forward network packets within a packet forwarding system including allowing a user to define through a user interface for a packet forwarding system one or more by-criteria (BC) filters and one or more not-passed-by-criteria (NPBC) filters for a common input port where each BC filter is configured to pass packets received from the common input port to at least one output port based upon at least one criterion relating to received packets and where each NPBC filter is configured to pass received packets not passed by the BC filters to at least one output port, generating packet forwarding rules based upon the one or more BC filters and the one or more NPBC filters, applying the packet forwarding rules to filter engines within the packet forwarding system where the filter engines are configured to determine how packets are forwarded between input ports and output ports within the packet forwarding system, receiving with the common input port packets from one or more network sources, passing received packets to at least one output port for the packet forwarding system based upon the one or more BC filters, and forwarding received packets not passed by the BC filters to at least one output port for the packet forwarding system based upon the one or more NPBC filters.

In further embodiments, the one or more BC filters includes one or more pass-by-criteria (PBC) filters coupled to the common input port where each PBC filter is configured to pass received packets that match at least one criterion relating to the received packets from the common input port to at least one output port, and the passing includes passing received packets that match the one or more PBC filters to at least one output port. In additional embodiments, the one or more NPBC filters includes a pass unmatched PBC filter coupled to the common input port where the pass unmatched PBC filter is configured to pass received packets that do not match any of the PBC filters from the common input port to at least one output port, and the forwarding includes forwarding received packets that do not match the one or more PBC filters to at least one output port. In still further embodiments, the at least one output port for the pass unmatched PBC filter is different from the at least one output port for the PBC filters.

In still further embodiments, the one or more BC filters includes one or more deny-by-criteria (DBC) filters coupled to the common input port where each DBC filter is configured to pass received packets that do not match at least one criterion relating to the received packets from the common input port to at least one output port, and the passing includes passing received packets that do not match the one or more DBC filters to at least one output port. In additional embodiments, the one or more NPBC filters includes a pass matched DBC filter coupled to the common input port where the pass matched DBC filter is configured to pass received packets that match all of the DBC filters from the common input port to at least one output port, and the forwarding includes forwarding received packets that match the one or more DBC filters to at least one output port. In still further embodiments, the at least one output port for the pass matched DBC filter is different from the at least one output port for the DBC filters.

For another embodiment, the one or more BC filters include one or more pass-by-criteria (PBC) filters coupled to the common input port where each PBC filter is configured to pass received packets that match at least one criterion relating to the received packets from the common input port to at least one output port and also includes one or more deny-by-criteria (DBC) filters coupled to the common input port where each DBC filter is configured to pass received packets that do not match at least one criterion relating to the received packets from the common input port to at least one output port, and the passing includes passing received packets that match the one or more PBC filters to at least one output port and passing received packets that do not match the one or more DBC filters to at least one output port. In further embodiments, the one or more NPBC filters includes a pass unmatched PBC filter coupled to the common input port where the pass unmatched PBC filter is configured to pass received packets that do not match any of the PBC filters from the common input port to at least one output port and also includes a pass matched DBC filter coupled to the common input port where the pass matched DBC filter is configured to pass received packets that match all of the DBC filters from the common input port to at least one output port, and the forwarding includes forwarding received packets that do not match the one or more PBC filters to at least one output port and forwarding received packets that match the one or more DBC filters to at least one output port. In still further embodiments, the at least one output port for the pass unmatched PBC filter is different from the at least one output port for the PBC filters, and the at least one output port for the pass matched DBC filter is different from the at least one output port for the DBC filters.

Different or additional features, variations, and embodiments can be implemented, if desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Figure 1A:
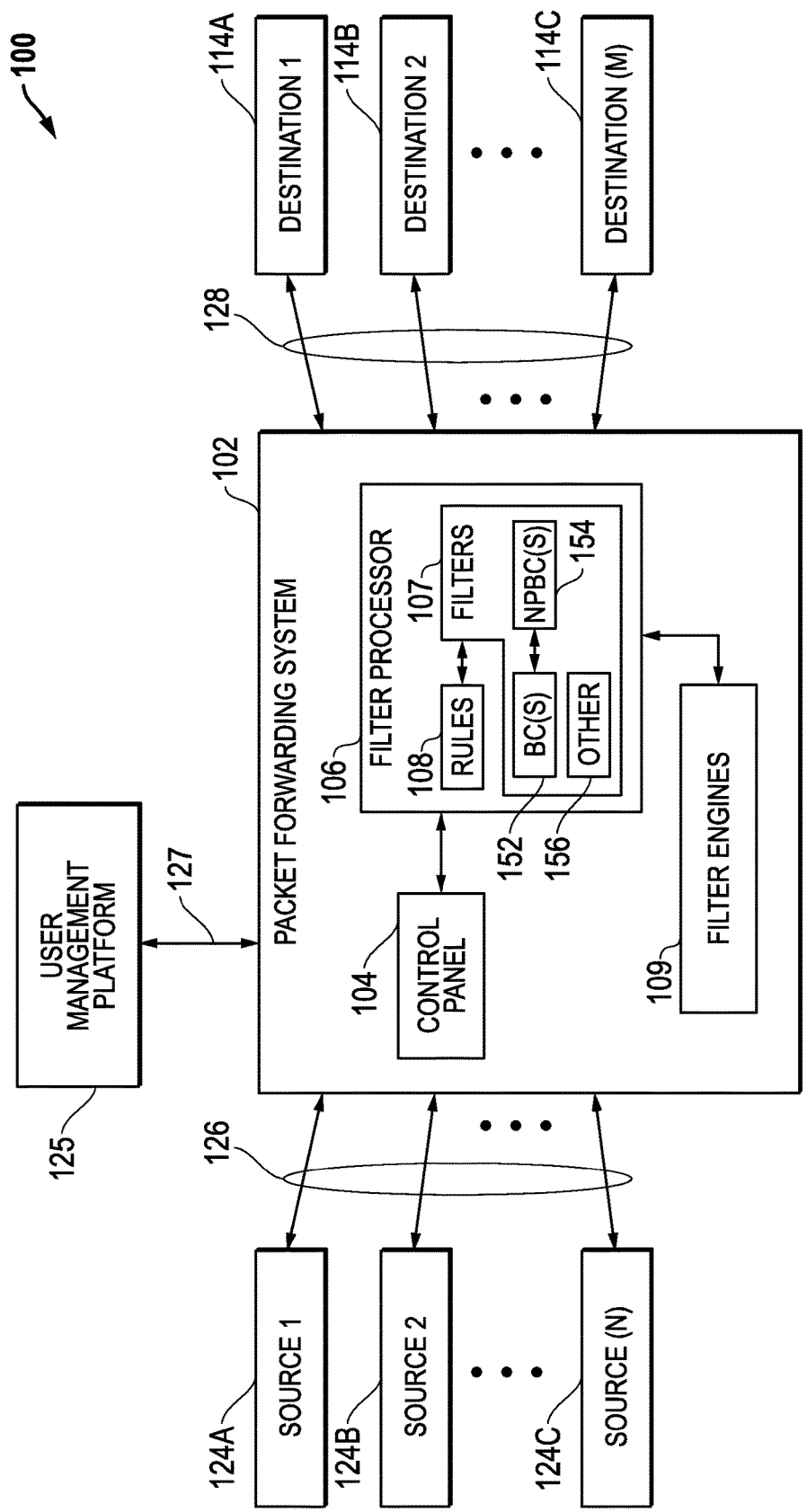
FIG. 1A is a block diagram of an example embodiment including a packet forwarding system having one or more filters configured to forward packets not passed by criteria-based filters.

Systems and methods are disclosed to forward packets not passed by criteria-based filters in packet forwarding systems. In part, the disclosed embodiment provide packet forwarding systems having dynamic user-configurable filters defined between input ports and output ports for the packet forwarding system. A filter processor generates packet forwarding rules that are applied to filter engines within a packet forwarding system to cause packets to be forwarded within the packet forwarding system according to the defined filters. The packet forwarding systems described herein are configured to allow one or more different dynamic filters to be defined including: Pass All filters that pass all input packets from connected input ports to connected output ports, Pass by Criteria (PBC) filters that pass only input packets matching selected criteria to the connected output ports, Deny All filters that pass no input packets to connected output ports, and Deny by Criteria (DBC) filters that pass only input packets not matching selected criteria to the connected output ports. As described herein, the disclosed embodiments also allow one or more Not Passed By Criteria (NPBC) filters to be defined for input ports along with one or more criteria-based filters, and these NPBC filters are configured to forward packets that are not passed by these criteria-based filters to output ports. In particular, these NPBC filters include: (1) Pass Unmatched PBC filters that are associated with PBC filters and that are configured to forward to one or more designated output ports packets that are not passed by PBC filters, and/or (2) Pass Matched DBC filters that are associated with DBC filters and that are configured to forward to one or more designated output ports packets that are not passed by DBC filters. Using one or more of the NPBC filters, therefore, packet data that is not being passed by the criteria-based filters to output ports can be easily passed to one or more designated output ports. Various combinations of criteria-based filters (e.g., Pass by Criteria filters, Deny by Criteria filters) can be used for input ports along with one or more NPBC filters also associated with these input ports. Different features and variations can be implemented, as desired, and related systems and methods can be utilized, as well.

Example embodiments for a packet forwarding systems including one or more By Criteria (BC) filters and one or more Not Passed By Criteria (NPBC) filters are described in more detail below with respect to FIGS. 1A-B and FIGS. 2A-B. Example embodiments using Pass Unmatched PBC filters as the NPBC filter are described in more detail below with respect to FIGS. 3A-B. Example embodiments using Pass Matched DBC filters as the NPBC filter are described in more detail below with respect to FIGS. 4A-B. An example embodiment including both a Pass Unmatched PBC filter and a Pass Matched DBC filter is described in more detail with respect to FIG. 5 below. Further, FIGS. 6A-6B provide example embodiments for implementations that use one or more virtual machine (VM) platforms operating in a virtualization environment to implement functionality described herein.

It is noted that the packet forwarding systems described herein can be configured to include hardware, software, or combined hardware and software implementations that filter, aggregate, and/or otherwise process and forward packets from network sources and make them available to one or more monitoring tools or other devices. According to one aspect of the disclosed embodiments, a packet forwarding system, such as a network tool optimizer (NTO) or packet broker, includes one or more input ports configured to receive network traffic, such as network packets communicated through a packet-based communication network, and one or more output ports configured to provide filtered network traffic to one or more network tools or other devices. U.S. Pat. No. 8,018,943, U.S. Pat. No. 8,098,677, and U.S. Pat. No. 8,934,495 describe example embodiments for network tool optimizer systems that provide packet forwarding systems for tool aggregation and packet broker solutions and describe in part configuration of user-define filters, automatic creation of filter engine forwarding rules, automatic handling of filter overlaps, graphical user interfaces (GUIs) for filter creation, and other features. U.S. Pat. No. 8,018,943, U.S. Pat. No. 8,098,677, and U.S. Pat. No. 8,934,495 are each hereby incorporated by reference in its entirety.

Looking now to FIG. 1, a block diagram is provided of an example embodiment 100 for a network environment including a packet forwarding system 102 having one or more Not Passed By Criteria (NPBC) filters 154 configured to forward packets not passed by one or more By Criteria (BC) filters 152. In operation, the packet forwarding system 102 receives copies of packet traffic from one or more network sources 124A, 124B . . . 124C through one or more network connections 126 and forwards these packets to one or more destinations 114A, 114B . . . 114C through network connections 128 based upon filter rules 108 applied to filter engines 109. As described in more detail below, the packet forwarding system 102 allows a user or administrator to view, define and/or manage filters 107 through a user management platform 125 connected to the system 102 through network connections 127. The filter processor 106 within the packet forwarding system 102 automatically generates the packet forwarding rules 108 based upon forwarding instructions defined by the filters 107. Once generated, the packet forwarding rules 108 are applied by the filter processor 106 to filter engines 109 to determine how packets are forwarded by the packet forwarding system 102 from input ports that receive network traffic from sources 124A, 124B . . . 124C to output ports that provide packets to the destinations 114A, 114B . . . 114C. The packet forwarding system 102 also includes a control panel 104 that provides user interfaces (UI), such as graphical user interface (GUI), that can be accessed through the user management platform 125 to allow users/administrators to view, create and/or manage the filters 107.

The embodiments described herein further include within filters 107 one or more By Criteria (BC) filters 152 and one or more Not Passed By Criteria (NPBC) filters 154. Other filters 156 can also be included as part of filters 107, if desired. As described herein, the By Criteria (BC) filters 152 can include, for example, Pass by Criteria (PBC) filters that are configured to pass packets that match criteria selected for the filters and Deny by Criteria (DBC) filters that are configured to pass packets that do not match criteria selected for the filters. Other criteria-based filters could also be used, if desired. Further, as described herein, the Not Passed By Criteria (NPBC) filters 154 can include, for example, Pass Unmatched PBC filters and Pass Matched DBC filters. Other NPBC filters 154 could also be used to pass packets not passed by the criteria-based filters depending upon the criteria-based filters implemented. Other variations could also be implemented.

With respect to Pass Unmatched PBC filters, each Pass Unmatched PBC filter accumulates or catches all traffic that does not match any of the Pass by Criteria filters connected to the network input ports to which it is connected. This unmatched traffic is sent to one or more output port(s) connected to the Pass Unmatched PBC filter. The Pass Unmatched PBC filter is paired with Pass by Criteria (PBC) filters that have been defined for the input port to which the Pass Unmatched PBC filter is also defined, and the Pass Unmatched PBC filter is independent of other dynamic filters defined for this input port, such as Pass All filters, Deny All filters, Deny by Criteria filters, and/or the Pass Matched DBC filters described herein. As such, the Pass Unmatched PBC filter will still forward traffic that matches other filters connected to the same input port as long as those packets do not match any of the Pass by Criteria filters also connected to the same input port. If a Pass Unmatched PBC filter is attached to an input port where there are no Pass by Criteria filters also attached, the Pass Unmatched PBC filter will pass all packets for that input port. Each input port can be configured to have one Pass Unmatched PBC filter, as it is a catchall filter that passes packets not matching any of the Pass by Criteria filters for that input port.

With respect to Pass Matched DBC filters, each Pass Matched DBC filter accumulates or catches all traffic that is denied by all of the Deny by Criteria filters connected to the network input ports to which it is connected. This matched traffic is sent to one or more output port(s) connected to the Matched DBC filter. The Pass Matched DBC filter is paired with Deny by Criteria (DBC) filters that have been defined for the input port to which the Pass Matched DBC filter is also defined, and the Pass Matched DBC filter is independent of other dynamic filters defined for this input port, such as Pass All filters, Deny All filters, Pass by Criteria filters, and the Pass Unmatched PBC filters described herein. As such, the Pass Matched DBC filter will still forward traffic that matches other filters connected to the same network input port as long as those packets match every Deny by Criteria filter also connected to the same network input port. If a Pass Matched DBC filter is attached to an input port where there are no attached DBC dynamic filters also attached, the Pass Matched DBC filter will pass no packets for that network input port. Each network input port can be configured to have one Pass Matched DBC filter, as it is a catchall filter that passes packets matching all of the Deny by Criteria filters for that input port.

A Pass Unmatched PBC filter and/or a Pass Matched DBC filter, therefore, can be defined for each input port thereby allowing, on a port by port basis, packets to be passed to one or more output ports where these packets do not match any PBC filters and/or where these packets matched all DBC filters. Once these NPBC filters 154 are defined along with any BC filters 152 and/or other filters 156 as part of filters 107, the filter processor 106 automatically generates forwarding rules 108 for the filter engines 109 within the packet forwarding system 102 so that packets are forwarding according to these defined filters. Further, the packet forwarding systems 102 described herein can be configured to ensure that addition of a new NPBC filter 154 does not impact the traffic on any other filter connected to the same input port. For example, a scratchpad memory can be used to add new filter engine rules for packet forwarding without causing data interruption to any filter except the one being modified, added, or removed. Further, statistics can also be maintained to ensure accurate counts for all filters but the one being modified, added, or removed, even while new filter engine rules 108 are being generated and applied to filter engines 109 within the packet forwarding system 102. Other variations and features can also be provided while still taking advantage of the Not Passed By Criteria (NPBC) filters 154 described herein.

Figure 1B:
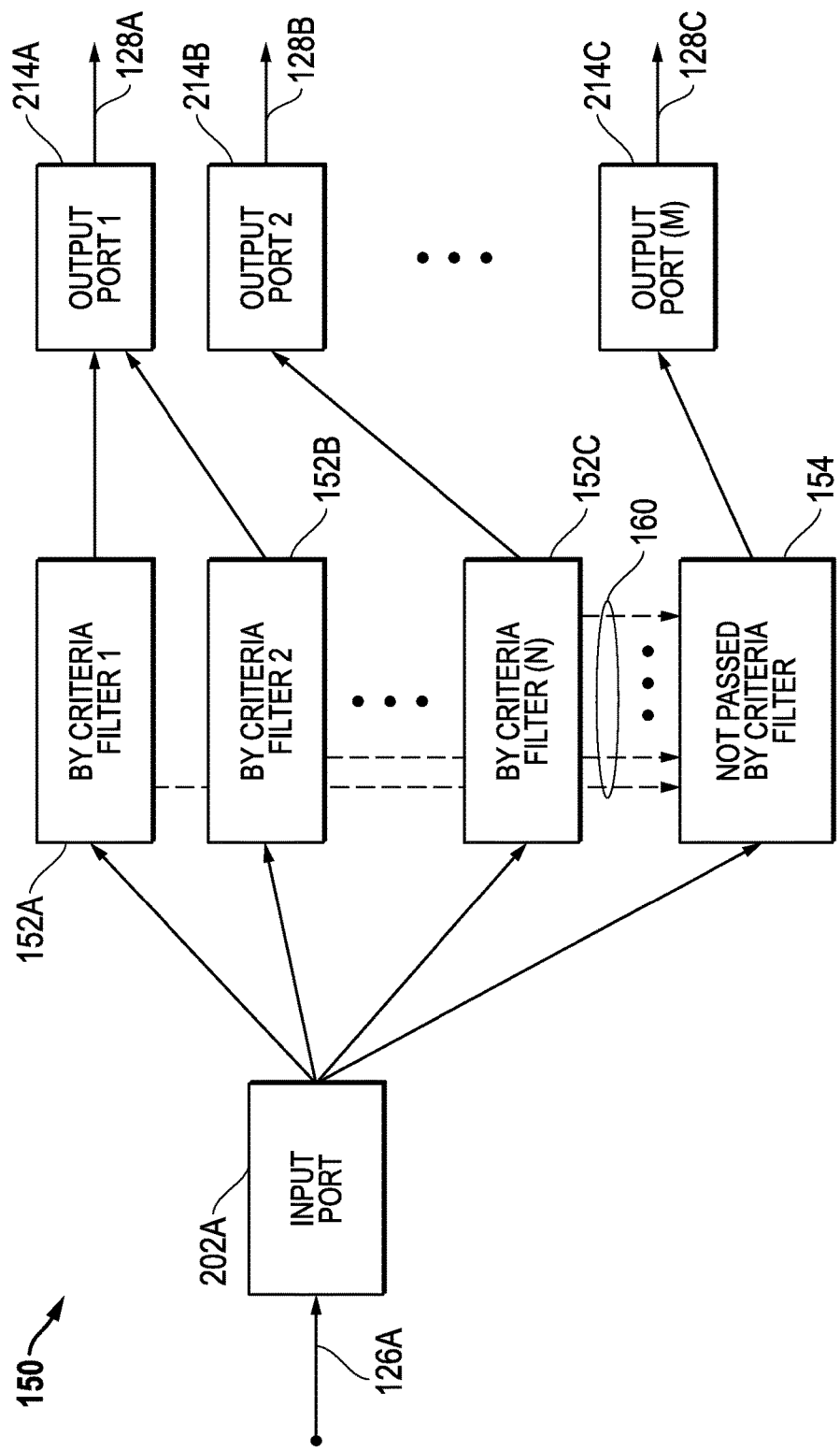
FIG. 1B is a block diagram of example embodiment for a Not Passed By Criteria (NPBC) filter applied to an input port along with a number of different By Criteria (BC) filters.

FIG. 1B is a block diagram of example embodiment 150 for a Not Passed By Criteria (NPBC) filter 154 applied to an input port 202A along with a set of different By Criteria (BC) filters 152A, 152B . . . 152C. For the example embodiment 150, a number of different By Criteria filters 152A, 152B . . . 152C have been defined and placed between the input port 202A and a number of different output ports 214A . . . 214B. In particular, a first By Criteria filter 152A is defined and placed between the input port 202A and a first output port 214A; a second By Criteria filter 152B is defined and placed between the input port 202A and the first output 214A; and so on with an Nth By Criteria filter 152C being defined and placed between the input port 202A and a second output port 214B. For example embodiment 150, a Not Passed By Criteria (NPBC) filter 154 is also defined and placed between the input port 202A and a Mth output port 214C, and this NPBC filter 154 is configured to pass packets not passed by the BC filters 152A, 152B . . . 152C.

In operation, the input port 202A receives packets from one of more packet sources through connection 126A. These received packets are then forwarded from the input port 202A to the output ports 214A, 214B . . . 214C based upon packet forwarding rules 108 generated for the BC filters 152A, 152B . . . 152C and the NPBC filter 154. For the example embodiment 150, packets passed by the By Criteria filter 152A and by the By Criteria filter 152B are provided to the first output port 214A for output to a packet destination, such as a network analysis tool, through connections 128A. Packets passed by the By Criteria filter 152C are provided to the second output port 214B for output to a packet destination, such as a network analysis tool, through connections 128B. As described above and as represented by dashed arrows 160, the NPBC filter 154 accumulates or catches the packets that are not passed by the By Criteria filters 152A, 152B . . . 152C, and these not-passed packets are provided to the Mth output port 214C for output to a packet destination, such as a network analysis tool, through connections 128C.

It is noted that the source network traffic provided by connections 126 can be obtained through one of a variety of techniques and devices, such as for example, from network TAPs, from SPAN ports on network switches, and/or from other devices or systems that copy or otherwise obtain packets or packet contents from network traffic flows and make them available for other devices and systems. Further, the network connections and communications described herein can include wired, wireless, and/or combinations of wired and wireless network communications among network-connected devices or systems and can include communications through one or more intervening devices or systems, such as firewalls, routers, switches, and/or other network-connected devices or systems.

It is also noted that the control panel 104 for the packet forwarding system 102 can be implemented as a web interface that can be accessed through a network browser (e.g., MICROSOFT Internet Explorer or MOZILLA Firefox) by other network-connected processing systems. For example, the packet forwarding system 102 can be configured to automatically download a control panel software application to the user management platform 125 when a network browser operating on the user management platform 125 connects to an IP address for the packet forwarding system 102. This download can occur the first time the network browser connects, and the control panel 104 can then be stored locally by the user management platform 125. The user management platform 125 can be, for example, personal computer systems, server systems, and/or other processing systems running WINDOWS operating systems, LINUX operating systems, and/or other operating system as desired. In one embodiment, the control panel 104 can in part be downloaded as JAVA-based software code or modules. Other implementations could also be implemented.

It is further noted that the network traffic sources 124A, 124B . . . 124C can include any of a wide variety of systems that are connected within a network communication system. These systems can include server systems, data storage systems, desktop computer systems, portable computer systems, network switches, broadband routers and/or any other desired processing systems that are connected into a cloud network, as desired. In addition to these systems, any number of network traffic destinations 114A, 114B . . . 114C can also be connected within the network communication system. Further, when implemented as network monitoring tools, the network traffic destinations 114A, 114B . . . 114C be can any of a wide variety of network related tools including traffic monitoring devices, packet sniffers, data recorders, voice-over-IP monitors, intrusion detection systems, network security systems, application monitors and/or any other desired network management or security tool device or system. Still further, as described herein, the sources 124A, 124B . . . 124C, the destinations 114A, 114B . . . 114C, the packet forwarding system 102, and/or the user management platform 125 can be implemented as virtual machines or instances within a virtual processing environment within a larger computing platform. It is further noted that the network communications can be based upon any desired protocol or combination of protocols including Ethernet protocols, multi-protocol label switching (MPLS) protocols, FibreChannel (FC) protocols and/or any other desired communication protocol that can be used for network communications including packet-based network communications.

Still further, it is noted that the filters 107 as well as the forwarding engine rules 108 generated by the filter processor 106 can rely upon various portions of the content of network packets for forwarding actions. For example, network packets typically include in part a link layer header (L2), a network layer header (L3), a transport layer header (L4) and a payload, as well as other network layers (e.g., layers within the Open Systems Interconnect (OSI) model for network communications). Information pertinent to forwarding the packet, such as source ID and destination ID and protocol type, is usually found in the packet headers. These packets may also have various other fields and information within them, such as fields including error check information, virtual local area network (VLAN) identifiers, and/or other information that may be matched and used for filtering. Further, information representing the source device may include items such as the IP address of the source device or the MAC (Media Access Control) address of the source device. Similarly, information representing the destination device may be included within the packet such as the IP address of the destination device. It is seen, therefore, that a wide variety of source and destination identifying information may be included within the packets as well as other packet related information along with the data included within the payload of the packet. While the packet forwarding system embodiments described herein are primarily described with respect to packet-based communications and utilize information within these packets to forward the packets, the packet forwarding system embodiments can be configured to operate with respect to other types of communication protocols and are not limited to packet-based networks.

Figure 2A:
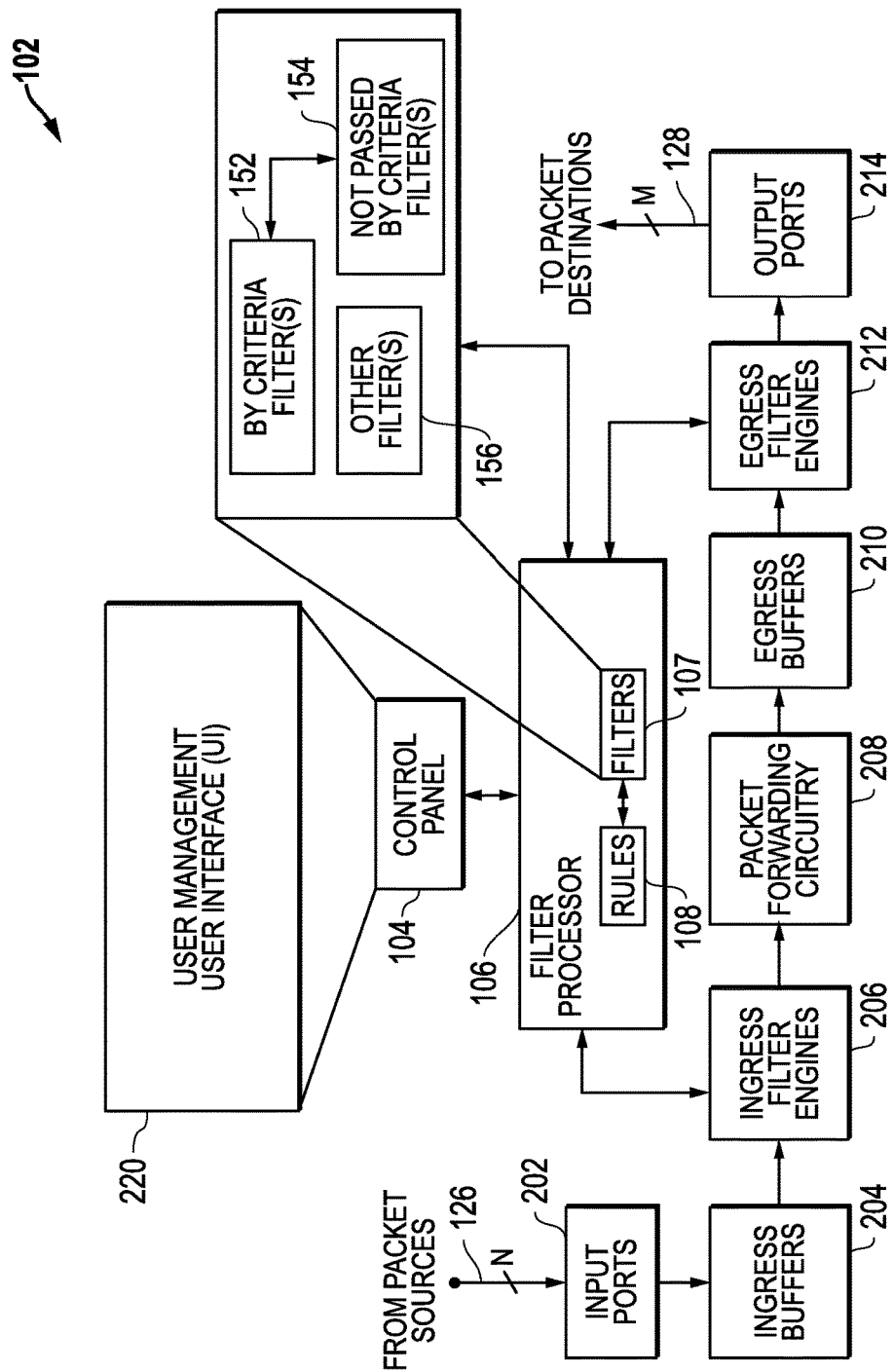
FIG. 2A is a block diagram of an example embodiment for a packet forwarding system.

Looking now to FIG. 2A, a block diagram is provided of an example embodiment for packet forwarding system 102. As described with respect to FIG. 1, the packet forwarding system 102 includes a control panel 104 that provides management access to a user management platform 125. The control panel 104 in part provides a user management user interface (UI) 220 through which a user can define, manage, and control the filters 107. The filter processor 106 for the packet forwarding system 102 processes the filters 107 to generate forwarding rules 108 for filter engines 109. For the embodiment of FIG. 2A, the filter engines 109 are implemented as ingress filter engines 206 and egress filter engines 212, and filter processor 106 applies the forwarding rules 108 to the filter engines 206/212.

In operation, the forwarding rules 108 determine at least in part how the filter engines 206/212 forward packets from input ports 202 to output ports 214 for the packet forwarding system 102 through packet forwarding circuitry 208. The packet forwarding circuitry 208 forwards packets between input ports 202 and output ports 214 based in part upon the forwarding rules 108 set up in the ingress filter engines 206 and the egress filter engines 212. For the embodiment depicted, packets from connections 126 are received at the input ports 202. These packets are then stored in ingress queues or buffers 204 prior to being processed by ingress filter engines 206. Based upon ingress filter rules within the ingress filter engines 206, the packet forwarding circuitry 208 forwards packets to the appropriate output ports 214. However, prior to being sent out through the output ports 214 to external systems, the outgoing packets are first stored in egress queues or buffers 210 and then processed by egress filter engines 212. Based upon egress filter rules within the egress filter engines 212, the egress filter engines 212 forward the appropriate packets to the output ports 214. The output ports 214 can be connected, for example, to network analysis tools through connections 128. The filter processor 106 communicates with the ingress filter engines 206 and egress filter engines 212 to apply the forwarding rules 108 so that these filter engines will provide the packet forwarding defined by the user filters 107.

It is noted that the packet forwarding system 102 can be implemented using one or more network packet switch integrated circuits (ICs), such as are available from Broadcom Corporation and/or other switch IC manufacturers. These switch integrated circuits include input port circuitry, ingress buffer circuitry, ingress filter engine circuitry, switch fabric packet forwarding circuitry, egress buffer circuitry, egress filter engine circuitry, output port circuitry, internal processors and/or other desired circuitry. Further these integrated circuits can include control and management interfaces through which they can be programmed to provide desired forwarding and control. As such, the filter processor 106 can program the filter engines within the network packet switch integrated circuit with appropriate forwarding rules. The packet forwarding system 102 can also include other circuitry and components, as desired. For example, packet forwarding system 102 can include one or more printed circuit boards (PCBs) upon which the network packet switch IC is mounted, power supply circuitry, signal lines coupled to external connections, and a variety of external connectors, such as Ethernet connectors, fiber optic connectors or other connectors, as desired. It is further noted that the packet forwarding system 102 including the filter processor 106 can be implemented using one or more processing devices. For example, the network packet switch ICs can be controlled and operated using one or more processors, microcontrollers, configurable logic devices (e.g., CPLD (complex programmable logic device), FPGAs (field programmable gate array)), and/or other processing devices that are programmed to control these integrated circuits to implement desired functionality. It is further noted that software or other programming instructions used for the packet forwarding system 102 and/or its components, such as filter processor 106 and the control panel 104, can be implemented as software or programming instructions embodied in a non-transitory computer-readable medium (e.g., memory storage devices, FLASH memory, DRAM memory, reprogrammable storage devices, hard drives, floppy disks, DVDs, CD-ROMs, etc.) including instructions that cause processing devices used by the packet forwarding system 102 to perform the processes, functions, and/or capabilities described herein.

In one embodiment for the packet forwarding system 102, a PCB can include a processor IC separate from a network packet switch IC. The filter processor 106 can then be configured to operate on the separate processor IC, and the separate processor IC can interface with an application programming interface (API) provided by the network packet switch vendor for the network packet switch IC. This API provides an abstracted programmatic interface with which to apply filter rules to the filter engines within a network packet switch IC to control how packets are forwarded by the packet switch IC within the packet forwarding system 102. As described further below with respect to FIGS. 6A-B, the packet forwarding system can also be implemented using one or more virtual machine (VM) platforms operating within a virtual processing environment hosted by one or more host processing systems.

As described herein, the packet forwarding system 102 automatically implements filters 107 as one or more forwarding rules 108 that are applied to filter engines 109, such as ingress filter engines 206 and egress filter engines 212 in FIG. 2A. The forwarding rules 108 represent the internal device specific representations that are used to implement the filter engine rules. For packet switch ICs, these device specific representations often include programming or provisioning of filter rules into ternary content-addressable memories (TCAMs) within the packet switch ICs. A filter rule typically includes a predicate and one or more action(s). The predicate is one or more traffic-matching criteria that are logically AND-ed together (e.g., TCAM matching criteria such as VLAN ID or Source IP address). Each predicate compares a key to a value. The key is computed by selecting fields from packets based on protocol and content of the packet. An action can be defined by the filtering rule and applied when a match occurs. For TCAMs (and packet switch IC filter engines), actions typically include where to forward the packet, whether to drop the packet, and/or other desired action(s) with respect to the packet. For example, additional actions can include adding headers, adding identifiers within headers, stripping headers, stripping identifiers within headers, and/or other additional actions to modify packet contents.

Based upon the applied filter rules 108, the filter engines 109, such as ingress filter engines 206 and egress filter engines 212 in FIG. 2A, conditionally direct traffic from the input ports to the output ports. Filter rules can specify a single traffic-matching criterion or they can involve Boolean expressions that logically combine various traffic-matching criteria to represent the desired filtering behavior. Further, the various criteria in the filter may include ranges and/or non-contiguous lists of values which effectively allow for a second level of OR-ing within the filters. In addition, other logic, such as NOT operations, and/or more complicated logic expressions such as source/destination pairs and bidirectional flows could also be represented in filter rules, if desired. A filter's traffic-matching criteria can be configured as desired. For example, matching criteria can be configured to include values in any ISO (International Standards Organization) OSI network layer 2 (L2) through layer 7 (L7) header value or packet content. It is noted that packet-based communications are often discussed in terms of seven communication layers under the OSI model: application layer (L7), presentation layer (L6), session layer (L5), transport layer (L4), network layer (L3), data link layer (L2), and physical layer (L1). Examples of traffic-matching filter criteria for packet-based communications include but are not limited to:

Layer 2 (L2): Source/Destination MAC address, VLAN, Ethertype

Layer 3 (L3): Source/Destination IP address, IP Protocol, Diffserv/TOS

Layer 4 (L4): Source/Destination L4 Port, TCP Control flags

It is noted that these L2-L4 criteria are useful because existing hardware designs for packet switch ICs parse these packet headers. However, packet switch devices can be improved by extending filter capabilities to layers 5-7 (L5-L7), and this additional filtering criteria can be used by the packet forwarding system 102 as well.

Figure 2B:
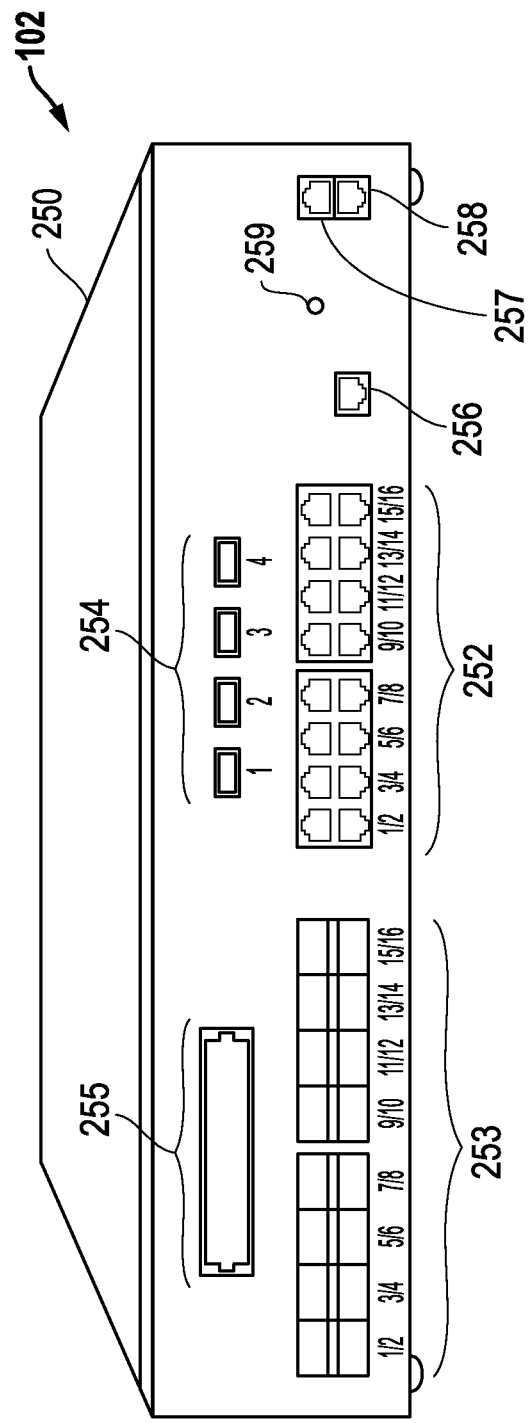
FIG. 2B is a diagram of an example embodiment for a product configuration as well as external connections for a packet forwarding system.

FIG. 2B is a diagram of an example embodiment for a product configuration as well as external connections for an example packet forwarding system 102. As depicted, the packet forwarding system 102 includes a housing 250 having external connection ports for a variety of connector types. For the example embodiment depicted, one set of network connection ports 252 (e.g., standard ports 1-16) can be configured to receive copper wire Ethernet connectors and can be used for one set of operational features (e.g., standard features) for the packet forwarding system 102. Another set of network connection ports 253 (e.g., advanced ports 1-16) can be configured to receive fiber optic connectors (e.g., small form-factor pluggable (SFP) modules) and can be configured to be used for another set of operational features (e.g., advanced features) for the packet forwarding system 102. Additional fiber optic connection ports 254 can also be provided for high-speed fiber optic connector modules (e.g., quad small form-factor pluggable (QSFP) modules), and a connector 255 can also be provided that is configured to receive CFP (C-Form Factor Pluggable) module connectors for high speed 40/100 Gigabyte communications. Further, one or more management network ports 257 and 258 can also be included, and these management network ports 257/258 can provide a control and management network interface to control panel 104 for the packet forwarding system 102. In addition, an additional management connection 256 can be provided as a direct out-of-band control connection for the packet forwarding system 102. It is further noted that circuitry for the packet forwarding system 102, including PCBs and power supply circuitry, can be mounted within the housing 250. A power button 259 an also be included. Other variations can also be implemented while still taking advantage of the Not Passed By Criteria (NPBC) filters 154 described herein.

Examples of By Criteria (BC) filters 152 and Not Passed By Criteria (NPBC) filters 154 will now be described in more detail with respect to FIGS. 3A-B (Pass by Criteria (PBC) and Pass Unmatched PBC filters), FIGS. 4A-B (Deny By Criteria (DBC) and Pass Matched DBC filters), and FIG. 5 (PBC filters, DBC filters, Pass Unmatched PBC filters. and Pass Matched DBC filters). It is noted that the all-capitals word "AND" used herein and in particular with respect to FIGS. 3A-B, FIGS. 4A-B, and FIG. 5 refers to a Boolean AND operation.

Figure 3A:
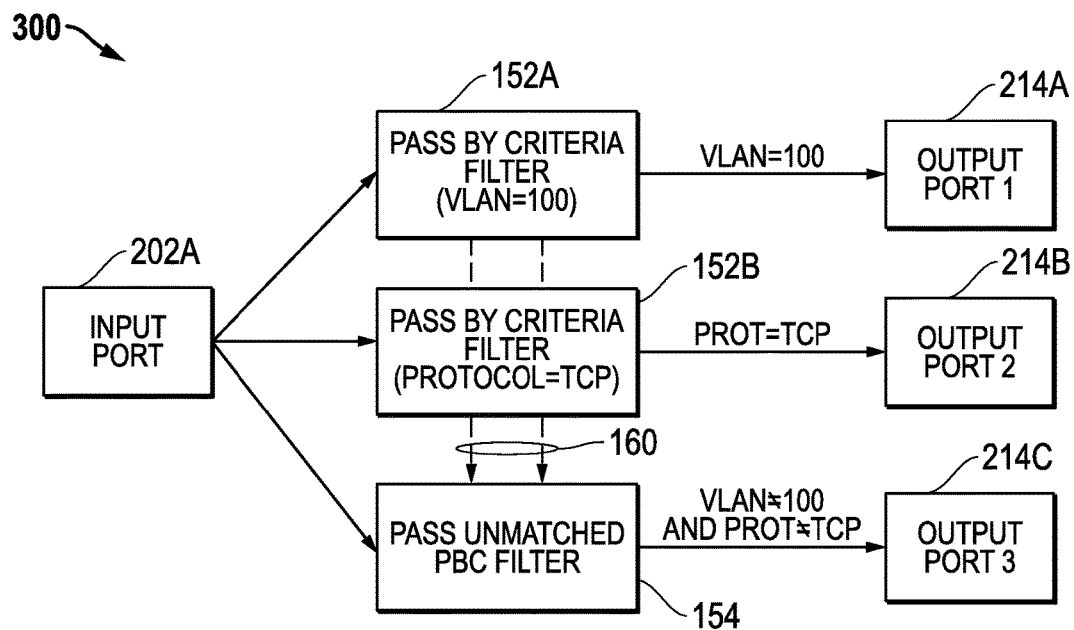
FIG. 3A is a block diagram of an example embodiment for filters connected to an input port including Pass by Criteria (PBC) filters along with a Pass Unmatched PBC filter.

FIG. 3A is a block diagram of an example embodiment 300 where filters 107 include two different Pass by Criteria (PBC) filters 152A and 152B attached to input port 202A along with a Pass Unmatched PBC filter 154 that passes packets that do not match any of the PBC filters 152A and 152B. For the example embodiment 300, the PBC filter 152A is configured to pass to a first output port 214A packets having a VLAN identifier equal to 100 (e.g., VLAN=100). Other packets are not passed by PBC filter 152A. The PBC filter 152B is configured to pass packets that use TCP (Transmission Control Protocol) as a network protocol (e.g., PROT=TCP) to a second output port 214B. Other packets are not passed by PBC filter 152B. As represented by dashed lines 160, packets that are not passed by any of the PBC filters 152A and 152B are accumulated or caught by the Pass Unmatched PBC filter 154 and passed to the third output port 214C. For the embodiment 300, therefore, packets that do not have a VLAN identifier of 100 and do not use a TCP protocol (e.g., VLAN≠100 AND PROT≠TCP) are passed by the Pass Unmatched PBC filter 154 to the third output port 214C.

In operation, therefore, the packet forwarding rules 108 generated for the filters 152A, 152B, and 154 of FIG. 3A and applied to the filter engines 109 will cause the packet forwarding shown in TABLE 1 between the input port 202A and output ports 214A, 214B, and 214C. With respect to the criteria in this table, an "X" represents that the condition is met (i.e., TRUE), and a blank represents that the condition is not met (i.e., NOT TRUE). With respect to the output ports in each row of this table, an "X" indicates that a packet having the conditions within that row is sent to the output port, and a blank indicates that a packet having the conditions of that row is not sent to this output port.

TABLE 1

Output Port Truth Table for FIG. 3A

| VLAN = 100 | PROT = TCP | Output Port 214A | Output Port 214B | Output Port 214C |
|---|---|---|---|---|
| X | X | X | X | |
| X |   | X |   | |
|   | X |   | X | |
|   |   |   |   | X |

Figure 3B:
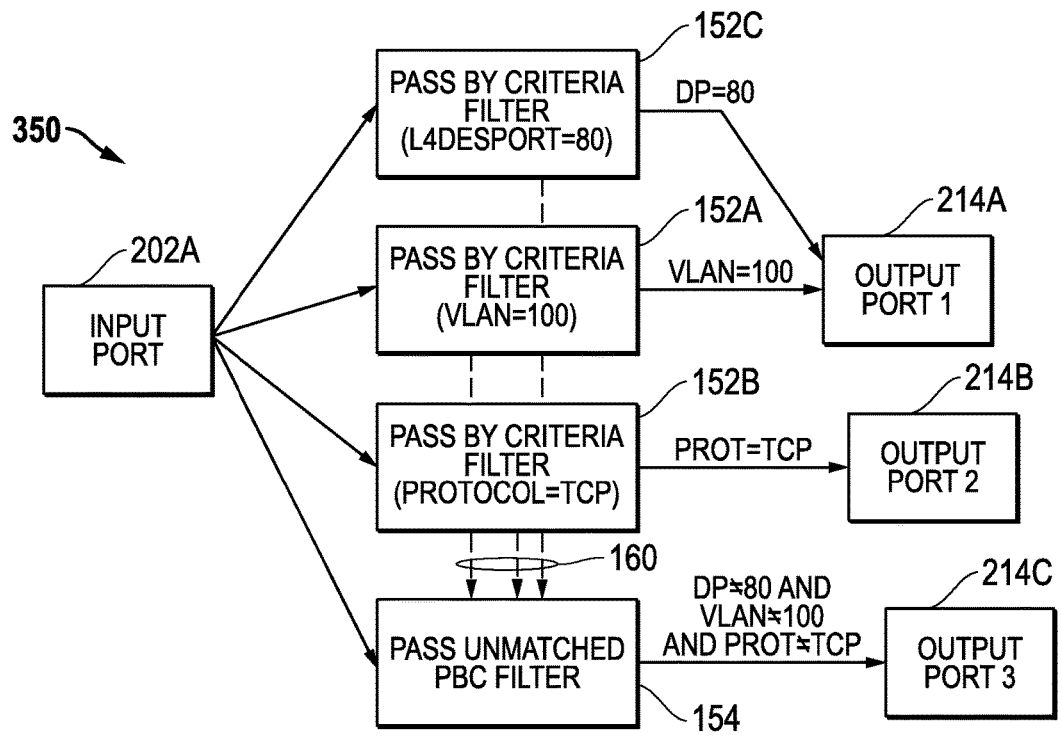
FIG. 3B is a block diagram of an example embodiment for filters where an additional Pass by Criteria (PBC) filter has been added to the filters of FIG. 3A.

FIG. 3B is a block diagram of an example embodiment 350 where an additional Pass by Criteria (PBC) filter 152C has been added to the filters of FIG. 3A. For the embodiment 350, this new PBC filter 152C is configured to pass packets that have an L4-layer destination port equal to 80 (e.g., DP=80) to the first port 214A. Other packets are not passed by PBC filter 152C. Because the Pass Unmatched PBC filter 154 is also attached to input port 202A, the Pass Unmatched PBC filter 154 will now accumulate or catch packets that are not passed by any of the PBC filters attached to input port 202A including the new PBC filter 152C. For the embodiment 350, therefore, packets that do not have a VLAN identifier of 100, do not use a TCP protocol, and do not have a destination port equal to 80 (e.g., VLAN≠100 AND PROT≠TCP AND DP≠80) are passed by the Pass Unmatched PBC filter 154 to the third output port 214C.

In operation, therefore, the packet forwarding rules 108 generated for the filters 152A, 152B, 152C, and 154 of FIG. 3B and applied to the filter engines 109 will cause the packet forwarding shown in TABLE 2 between the input port 202A and output ports 214A, 214B, and 214C. With respect to the criteria in this table, an "X" represents that the condition is met (i.e., TRUE), and a blank represents that the condition is not met (i.e., NOT TRUE). With respect to the output ports in each row of this table, an "X" indicates that a packet having the conditions within that row is sent to the output port, and a blank indicates that a packet having the conditions of that row is not sent to this output port

TABLE 2

Output Port Truth Table for FIG. 3B

| DP = 80 | VLAN = 100 | PROT = TCP | Output Port 214A | Output Port 214B | Output Port 214C |
|---|---|---|---|---|---|
| X | X | X | X | X | |
| X | X |   | X |   | |
| X |   | X | X | X | |
| X |   |   | X |   | |
|   | X | X | X | X | |
|   | X |   | X |   | |
|   |   | X |   | X | |
|   |   |   |   |   | X |

Figure 4A:
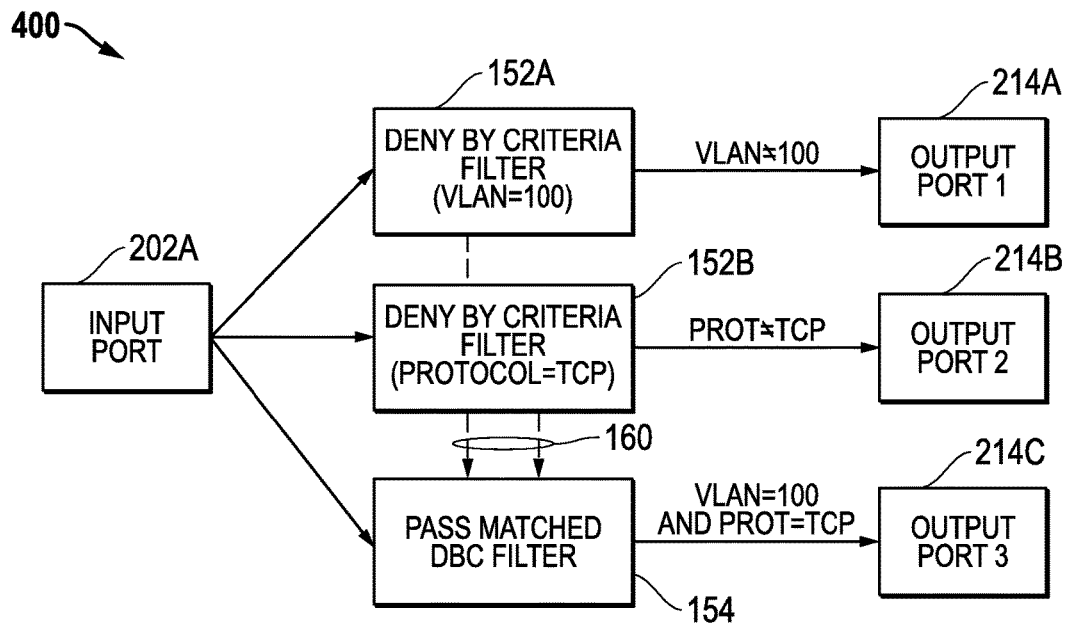
FIG. 4A is a block diagram of an example embodiment for filters connected to an input port including Deny by Criteria (DBC) filters along with a Pass Matched DBC filter.

FIG. 4A is a block diagram of an example embodiment 400 where filters 107 include two different Deny by Criteria (DBC) filters 152A and 152B attached to input port 202A along with a Pass Matched DBC filter 154 that passes packets that match all of the DBC filters 152A and 152B. For the example embodiment 400, the DBC filter 152A is configured to deny packets having a VLAN identifier equal to 100 (e.g., VLAN=100) from being passed to a first output port 214A. Other packets are passed by DBC filter 152A. The DBC filter 152B is configured to deny packets that use TCP (Transmission Control Protocol) as a network protocol (e.g., PROT=TCP) from being passed to a second output port 214B. Other packets are passed by DBC filter 152B. As represented by dashed lines 160, packets that are not passed by any of the DBC filters 152A and 152B are accumulated or caught by the Pass Matched DBC filter 154 and passed to the third output port 214C. For the embodiment 400, therefore, packets that have a VLAN identifier of 100 and use a TCP protocol (e.g., VLAN=100 AND PROT=TCP) are passed by the Pass Matched DBC filter 154 to the third output port 214C.

In operation, therefore, the packet forwarding rules 108 generated for the filters 152A, 152B, and 154 of FIG. 4A and applied to the filter engines 109 will cause the packet forwarding shown in TABLE 3 between the input port 202A and output ports 214A, 214B, and 214C. With respect to the criteria in this table, an "X" represents that the condition is met (i.e., TRUE), and a blank represents that the condition is not met (i.e., NOT TRUE). With respect to the output ports in each row of this table, an "X" indicates that a packet having the conditions within that row is sent to the output port, and a blank indicates that a packet having the conditions of that row is not sent to this output port.

TABLE 3

Output Port Truth Table for FIG. 4A

| VLAN = 100 | PROT = TCP | Output Port 214A | Output Port 214B | Output Port 214C |
|---|---|---|---|---|
| X | X |   |   | X |
| X |   |   | X |   |
|   | X | X |   |   |
|   |   | X | X |   |

Figure 4B:
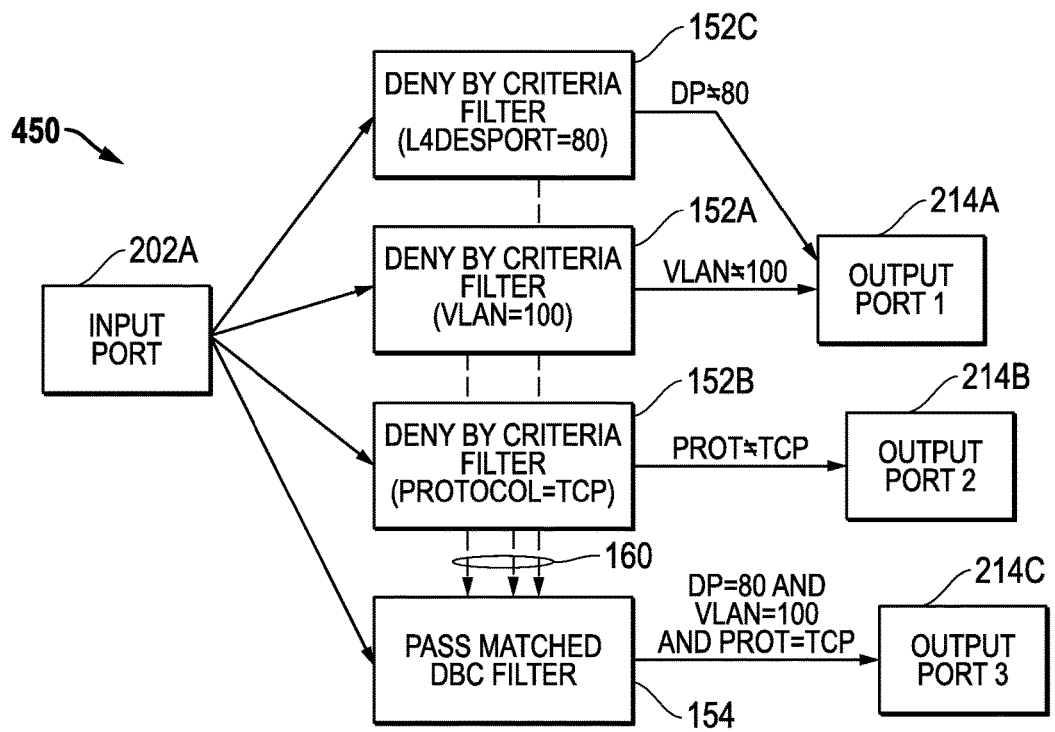
FIG. 4B is a block diagram of an example embodiment for filters where an additional Deny by Criteria (DBC) filter has been added to the filters of FIG. 4A.

FIG. 4B is a block diagram of an example embodiment 450 where an additional Deny by Criteria (DBC) filter 152C has been added to the filters of FIG. 4A. For the embodiment 450, this new DBC filter 152C is configured to deny packets that have an L4-layer destination port equal to 80 (e.g., DP=80) from being passed to the first port 214A. Other packets are passed by DBC filter 152C. Because the Pass Matched DBC filter 154 is also attached to input port 202A, the Pass Matched DBC filter 154 will now accumulate or catch packets that are not passed by any of the DBC filters attached to input port 202A including the new DBC filter 152C. For the embodiment 450, therefore, packets that have a VLAN identifier of 100, use a TCP protocol, and have a destination port equal to 80 (e.g., VLAN=100 AND PROT=TCP AND DP=80) are passed by the Pass Matched DBC filter 154 to the third output port 214C.

In operation, therefore, the packet forwarding rules 108 generated for the filters 152A, 152B, 152C, and 154 of FIG. 4B and applied to the filter engines 109 will cause the packet forwarding shown in TABLE 4 between the input port 202A and output ports 214A, 214B, and 214C. With respect to the criteria in this table, an "X" represents that the condition is met (i.e., TRUE), and a blank represents that the condition is not met (i.e., NOT TRUE). With respect to the output ports in each row of this table, an "X" indicates that a packet having the conditions within that row is sent to the output port, and a blank indicates that a packet having the conditions of that row is not sent to this output port

TABLE 4

Output Port Truth Table for FIG. 4B

| DP = 80 | VLAN = 100 | PROT = TCP | Output Port 214A | Output Port 214B | Output Port 214C |
|---|---|---|---|---|---|
| X | X | X |   |   | X |
| X | X |   |   | X |   |
|   |   | X | X | X |   |
| X |   |   | X | X |   |
|   | X |   |   | X | X |
|   |   | X |   | X |   |
|   |   |   |   | X | X |

Figure 5:
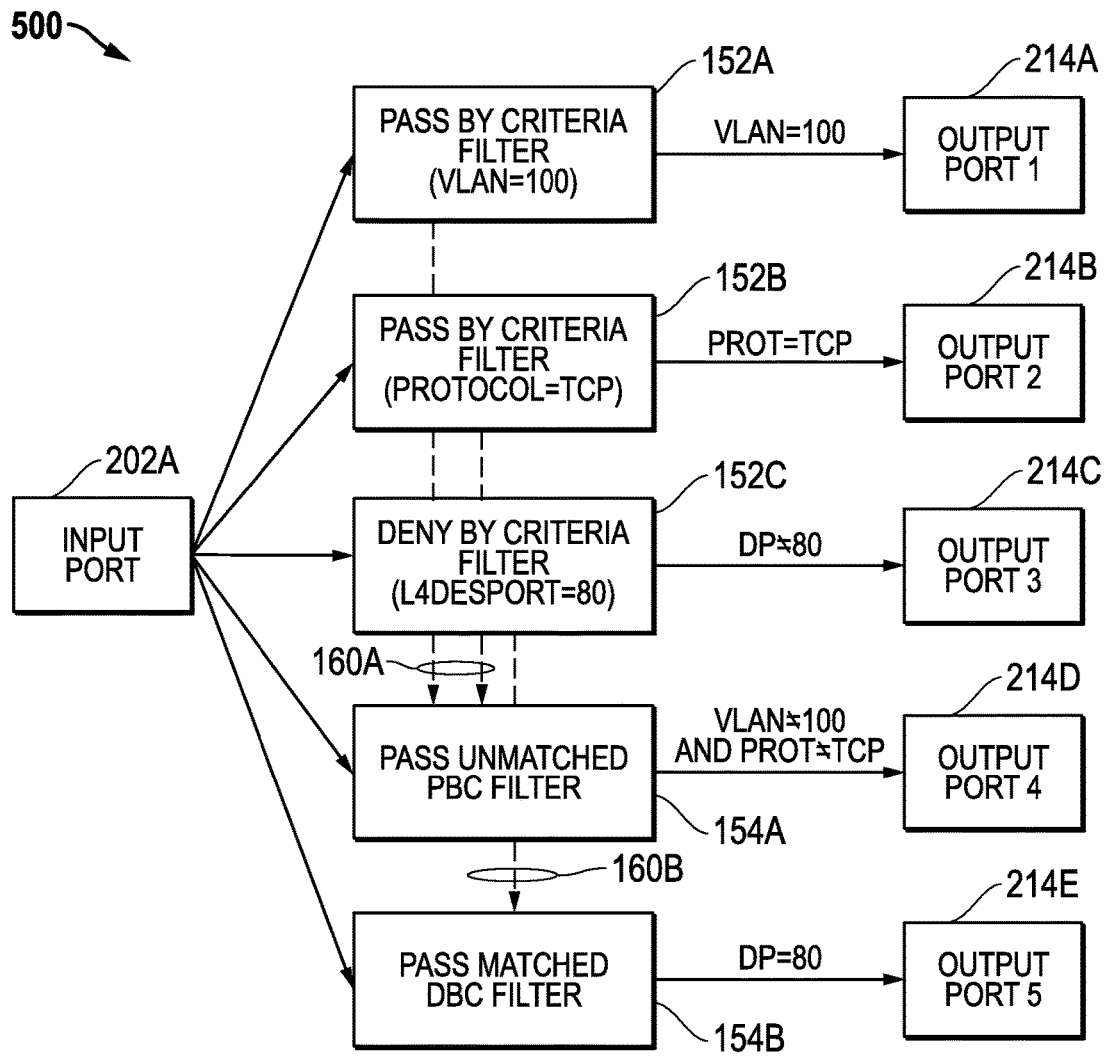
FIG. 5 is a block diagram of an example embodiment for filters connected to an input port including Pass by Criteria (PBC) filters along with a Pass Unmatched PBC filter and including Deny by Criteria (DBC) filters along with a Pass Matched DBC filter.
Figure 6A:
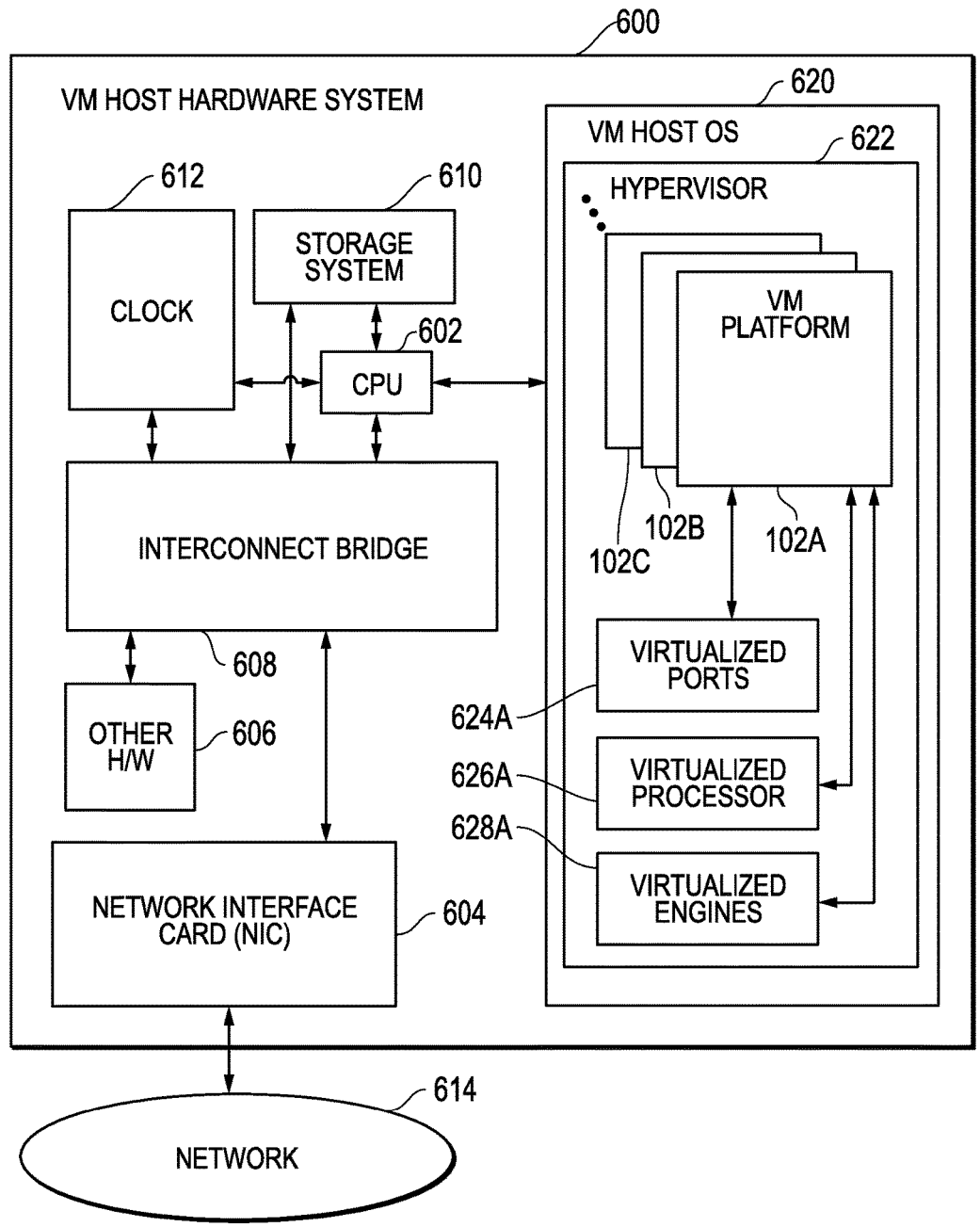
FIG. 6A is a block diagram of an example embodiment for a virtual machine (VM) host hardware system that includes VM platforms implementing packet forwarding systems.
Figure 6B:
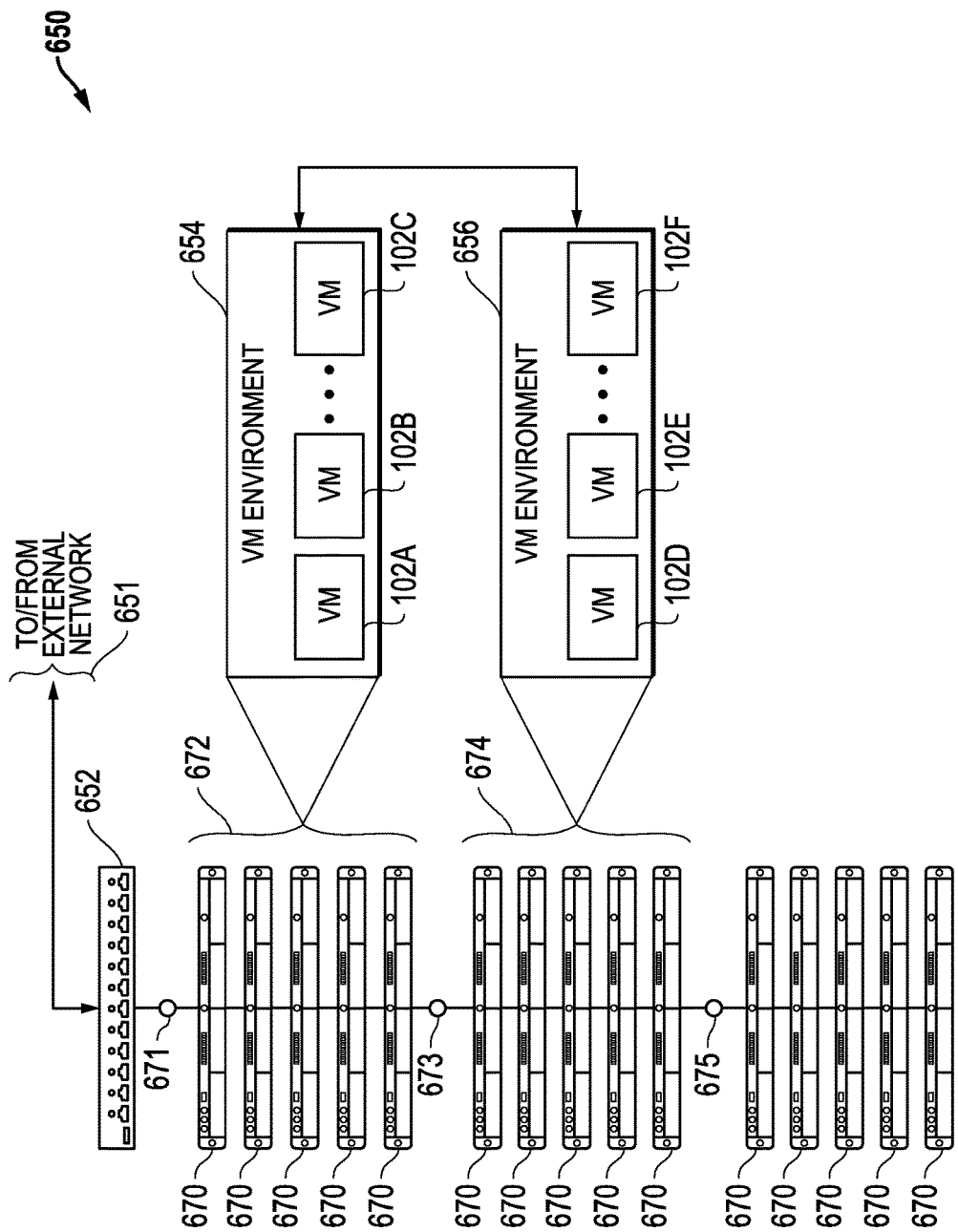
FIG. 6B is a block diagram of an example embodiment for a server system including multiple VM environments that host VM platforms implementing packet forwarding systems.

FIG. 5 is a block diagram of an example embodiment 500 where filters 107 include two Pass by Criteria (PBC) filters 152A and 152B and one Deny by Criteria filter 152C along with both a Pass Unmatched PBC filter 154A and a Pass Matched DBC filter 154B. The Pass Unmatched PBC filter 154A passes packets that are not matched by any of the PBC filters 152A and 152B. The Pass Matched DBC filter 154B passes packets that are matched by all of the DBC filter 152C.

With respect to the PBC filters 152A and 152B for the example embodiment 500, the PBC filter 152A is configured to pass packets having a VLAN identifier equal to 100 (e.g., VLAN=100) to a first output port 214A. Other packets are not passed by PBC filter 152A. The PBC filter 152B is configured to pass packets that use TCP (Transmission Control Protocol) as a network protocol (e.g., PROT=TCP) to a second output port 214B. Other packets are not passed by the PBC filter 152B. As represented by dashed lines 160A, packets that are not passed by any of the PBC filters 152A and 152B are accumulated or caught by the Pass Unmatched PBC filter 154A and passed to the fourth output port 214D. For the embodiment 500, therefore, packets that do not have a VLAN identifier of 100 and do not use a TCP protocol (e.g., VLAN≠100 AND PROT≠TCP) are passed by the Pass Unmatched PBC filter 154A to the fourth output port 214D.

With respect to the DBC filter 152C for the example embodiment 500, the DBC filter 152C is configured to deny packets having an L4-layer destination port equal to 80 (e.g., DP=80) from being passed to a third output port 214C. Other packets are passed by DBC filter 152C. As represented by dashed line 160B, packets that are not passed by the DBC filter 152C are accumulated or caught by the Pass Matched DBC filter 154B and passed to the fifth output port 214E. For the embodiment 500, therefore, packets that have an L4 destination port of 80 (e.g., DP=80) are passed by the Pass Matched DBC filter 154B to the fifth output port 214E.

In operation, therefore, the packet forwarding rules 108 generated for the filters 152A, 152B, 152C, 154A, and 154B of FIG. 5 and applied to the filter engines 109 will cause the packet forwarding shown in TABLE 5 between the input port 202A and output ports 214A, 214B, 214C, 214D, and 214E. With respect to the criteria in this table, an "X" represents that the condition is met (i.e., TRUE), and a blank represents that the condition is not met (i.e., NOT TRUE). With respect to the output ports in each row of this table, an "X" indicates that a packet having the conditions within that row is sent to the output port, and a blank indicates that a packet having the conditions of that row is not sent to this output port.

TABLE 5

Output Port Truth Table for FIG. 5

| VLAN = 100 | PROT = TCP | DP = 80 | Output Port 214A | Output Port 214B | Output Port 214C | Output Port 214D | Output Port 214E |
|---|---|---|---|---|---|---|---|
| X | X | X | X | X |   |   | X |
| X | X |   | X | X | X |   |   |
|   | X | X |   | X |   |   | X |
| X |   | X | X |   |   |   | X |
| X |   |   | X |   | X |   |   |
|   | X |   |   | X | X |   |   |
|   |   | X |   |   |   | X | X |
|   |   |   |   |   | X | X |   |

As indicated above, the packet forwarding system 102 can also be implemented using one or more virtual machine (VM) platforms within a virtual processing environment hosted by one or more host processing systems. FIGS. 6A-B provide example embodiments of virtual environments. For example, one or more of the components within the network environment 100 of FIG. 1A and/or within the packet forwarding system 102 of FIG. 2A can be virtualized such that they operate as one or more VM platforms within a virtual environment. Virtual resources can be made available, for example, through processors and/or processing cores associated with one or more server processing systems or platforms (e.g., server blades) used to provide software processing instances or VM platforms within a server processing system. A virtual machine (VM) platform is an emulation of a processing system that is created within software being executed on a VM host hardware system. By creating VM platforms within a VM host hardware system, the processing resources of that VM host hardware system become virtualized for use within the network communication system. The VM platforms can be configured to perform desired functions that emulate one or more processing systems.

Looking now to FIG. 6A, a block diagram is provided of an example embodiment for a virtual machine (VM) host hardware system 600 that communicates with a network 614 such as a packet network communication system. For the example embodiment depicted, the VM host hardware system 600 includes a central processing unit (CPU) 602 that runs a VM host operating system 620. An interconnect bridge 608 couples the CPU 602 to additional circuitry and devices within the VM host hardware system 600. For example, a system clock 612, a network interface card (NIC) 604, a data storage system 610 (e.g., memory) and other hardware (H/W) 606 are coupled to the CPU 602 through the interconnect bridge 608. The system clock 612 and the storage system 610 can also have a direct connections to the CPU 602. Other hardware elements and variations can also be provided.

The VM host hardware system 600 also includes a hypervisor 622 that executes on top of the VM host operating system (OS) 620. This hypervisor 622 provides a virtualization layer including one or more VM platforms that emulate processing systems, such as the packet forwarding systems 102A, 102B, 102C . . . described above, and that provide related processing resources. As shown with respect to VM platform that implements a first packet forwarding system 102, each of the VM platforms 102A, 102B, 102C . . . can be configured to have one or more virtual hardware resources associated with it, such as virtualized ports 624A, a virtualized processor 626A, virtualized filter engines 628A, and/or other virtualized resources. The VM host hardware system 600 hosts each of the VM platforms 102A, 102B, 102C . . . and makes their processing resources available to the network 614 through the VM host operating system 620 and the hypervisor 622. As such, the hypervisor 622 provides a management and control virtualization interface layer for the VM platforms 102A-C. It is further noted that the VM host operating system 620, the hypervisor 622, the VM platforms 102A-C, and the virtualized hardware resources 624A/626A/628A can be implemented, for example, using computer-readable instructions stored in a non-transitory data storage medium that are accessed and executed by one or more processing devices, such as the CPU 602, to perform the functions for the VM host hardware system 600.

FIG. 6B is a block diagram of an example embodiment for a server system 650 including multiple VM environments 654 and 674 that host VM platforms implementing packet forwarding systems. For the example embodiment 650, a number of processing system platforms 670, such as blade servers that include one or more VM host hardware systems 600 of FIG. 6A, are connected to an external network communication system through connections 651 and to each other through a router or switch 652. For the example embodiment 650, the processing system platforms 670 are configured into three nominal groups as indicated by nodes 671, 673, and 675. The processing system platforms 670 within each group are managed together to provide virtual processing resources as part of the network communication system. For the example embodiment 650, one group 672 of processing system platforms 670 is used to host a VM environment 654 that includes virtual machine (VM) platforms operating to provide packet forwarding systems 102A, 102B . . . 102C, respectively. One other group 674 of processing system platforms 670 is used to host a VM environment 656 that includes virtual machine (VM) platforms operating to provide packet forwarding systems 102D, 102E . . . 102F, respectively. As described herein, each of the VM platforms 102A-C and 102A-F can be configured to use one or more Not Passed By Criteria (NPBC) filters 154 that are defined along with one or more By Criteria (BC) filters 152 between input ports and output ports and that forward packets not otherwise passed by these criteria-based filters. In particular, these not-passed packets are forwarded by a NPBC filter 154 to one or more output port(s) connected to the NPBC filter 154.

It is noted that other groupings of processing system platforms 670 can also be used, or all of the processing system platforms 670 can be managed individually or as a single unit. It is also noted that the VM platforms 102A-C within VM environment 654 can communicate with each other, with the other VM environment 656, or with other processing systems or virtual environments within server system 650 or the external network. Similarly, the VM platforms 102D-F within VM environment 656 can communicate with each other, with the other VM environment 654, or with other processing systems or virtual environments within server system 650 or the external network. Further, it is noted that the processing system platforms 670 can be connected to each other by a high-speed communication backbone. Other variations could also be implemented while still taking advantage of the Not Passed By Criteria (NPBC) filters 154 described herein.

It is further noted that the functional blocks, systems, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A packet forwarding system for network packets, comprising:
   input ports configured to receive packets from one or more network sources;
   output ports configured to send packets to one or more network destinations;
   filter engines configured to determine how packets are forwarded by packet forwarding circuitry from the input ports to the output ports based upon packet forwarding rules;
   a user interface configured to allow configuration of one or more pass-by-criteria (PBC) filters and a pass unmatched PBC filter coupled to a common input port,
      wherein each PBC filter is configured to pass received packets that match at least one criterion relating to the received packets from the common input port to at least one output port; and
      wherein the pass unmatched PBC filter is configured to pass received packets that do not match any of the PBC filters from the common input port to at least one output port; and
   a filter processor configured to generate packet forwarding rules for the filter engines based upon the one or more PBC filters and the pass unmatched PBC filter, and to apply the packet forwarding rules to the filter engines.

2. The packet forwarding system of claim 1, wherein the at least one output port for the pass unmatched PBC filter is different from the at least one output port for the PBC filters.

3. A packet forwarding system for network packets, comprising:
   input ports configured to receive packets from one or more network sources;
   output ports configured to send packets to one or more network destinations;
   filter engines configured to determine how packets are forwarded by packet forwarding circuitry from the input ports to the output ports based upon packet forwarding rules;
   a user interface configured to allow configuration of one or more deny by-criteria (DBC) filters and a pass matched DBC filter coupled to a common input port,
      wherein each DBC filter is configured to pass received packets that do not match at least one criterion relating to the received packets from the common input port to at least one output port; and
      wherein the pass matched DBC filter is configured to pass received packets that match all of the DBC filters from the common input port to at least one output port; and
   a filter processor configured to generate packet forwarding rules for the filter engines based upon the one or more DBC filters and the pass matched DBC filter, and to apply the packet forwarding rules to the filter engines.

4. The packet forwarding system of claim 3, wherein the at least one output port for the pass matched DBC filter is different from the at least one output port for the DBC filters.

5. A packet forwarding system for network packets, comprising:
   input ports configured to receive packets from one or more network sources;
   output ports configured to send packets to one or more network destinations;
   filter engines configured to determine how packets are forwarded by packet forwarding circuitry from the input ports to the output ports based upon packet forwarding rules;
   a user interface configured to allow configuration of:
      one or more pass-by-criteria (PBC) filters coupled to a common input port, each PBC filter being configured to pass received packets that match at least one criterion relating to the received packets from the common input port to at least one output port;
      one or more deny-by-criteria (DBC) filters coupled to the common input port, each DBC filter being configured to pass received packets that do not match at least one criterion relating to the received packets from the common input port to at least one output port;

a pass unmatched PBC filter coupled to the common input port, the pass unmatched PBC filter being configured to pass received packets that do not match any of the PBC filters from the common input port to at least one output port; and a pass matched DBC filter coupled to the common input port, the pass matched DBC filter being configured to pass received packets that match all of the DBC filters from the common input port to at least one output port; and a filter processor configured to generate packet forwarding rules for the filter engines based upon the one or more PBC filters, the one or more DBC filters, the pass unmatched PBC filter, and the pass matched DBC filter, and to apply the packet forwarding rules to the filter engines.

6. The packet forwarding system of claim 5, wherein the at least one output port for the pass unmatched PBC filter is different from the at least one output port for the PBC filters, and wherein the at least one output port for the pass matched DBC filter is different from the at least one output port for the DBC filters.

7. A method to forward network packets within a packet forwarding system, comprising:

allowing a user to define through a user interface for a packet forwarding system one or more pass-by-criteria (PBC) filters and a pass unmatched PBC filter coupled to a common input port,
wherein each PBC filter is configured to pass received packets that match at least one criterion relating to the received packets from the common input port to at least one output port, and
wherein the pass unmatched PBC filter is configured to pass received packets that do not match any of the PBC filters from the common input port to at least one output port;

generating packet forwarding rules based upon the one or more PBC filters and the pass unmatched PBC filter;
applying the packet forwarding rules to filter engines within the packet forwarding system, the filter engines being configured to determine how packets are forwarded between input ports and output ports within the packet forwarding system;
receiving, with the common input port, packets from one or more network sources;
passing received packets to at least one output port for the packet forwarding system based upon the one or more PBC filters; and
forwarding received packets that do not match any of the one or more PBC filters to at least one output port based upon the pass unmatched PBC filter.

8. The method of claim 7, wherein the at least one output port for the pass unmatched PBC filter is different from the at least one output port for the PBC filters.

9. A method to forward network packets within a packet forwarding system, comprising:

allowing a user to define through a user interface for a packet forwarding system one or more deny-by-criteria (DBC) filters and a pass matched DBC filter coupled to a common input port,
wherein each DBC filter is configured to pass received packets that do not match at least one criterion relating to the received packets from the common input port to at least one output port, and
wherein the pass matched DBC filter is configured to pass received packets that match all of the DBC filters from the common input port to at least one output port;

generating packet forwarding rules based upon the one or more DBC filters and the pass matched DBC filter;
applying the packet forwarding rules to filter engines within the packet forwarding system, the filter engines being configured to determine how packets are forwarded between input ports and output ports within the packet forwarding system;
receiving, with the common input port, packets from one or more network sources;
passing received packets to at least one output port for the packet forwarding system based upon the one or more DBC filters; and
forwarding received packets that match all of the one or more DBC filters to at least one output port based upon the pass matched DBC filter.

10. The method of claim 9, wherein the at least one output port for the pass matched DBC filter is different from the at least one output port for the DBC filters.

11. A method to forward network packets within a packet forwarding system, comprising:

allowing a user to define through a user interface for a packet forwarding system:
one or more pass-by-criteria (PBC) filters coupled to a common input port, each PBC filter being configured to pass received packets that match at least one criterion relating to the received packets from the common input port to at least one output port; and
one or more deny-by-criteria (DBC) filters coupled to the common input port, each DBC filter being configured to pass received packets that do not match at least one criterion relating to the received packets from the common input port to at least one output port;
a pass unmatched PBC filter coupled to the common input port, the pass unmatched PBC filter being configured to pass received packets that do not match any of the PBC filters from the common input port to at least one output port; and
a pass matched DBC filter coupled to the common input port, the pass matched DBC filter being configured to pass received packets that match all of the DBC filters from the common input port to at least one output port;

generating packet forwarding rules based upon the one or more PBC filters, the one or more DBC filters, the pass unmatched PBC filter, and the pass matched DBC filter;
applying the packet forwarding rules to filter engines within the packet forwarding system, the filter engines being configured to determine how packets are forwarded between input ports and output ports within the packet forwarding system;
receiving, with the common input port, packets from one or more network sources;
passing received packets to at least one output port for the packet forwarding system based upon the one or more PBC filters and the one or more DBC filters;
forwarding received packets that do not match any of the one or more PBC filters to at least one output port based upon the pass unmatched PBC filter; and
forwarding received packets that match all of the one or more DBC filters to at least one output port based upon the pass matched DBC filter.

12. The method of claim 11, wherein the at least one output port for the pass unmatched PBC filter is different from the at least one output port for the PBC filters, and wherein the at least one output port for the pass matched DBC filter is different from the at least one output port for the DBC filters.

\* \* \* \* \*